United States Patent
Vallis

(10) Patent No.: US 7,050,252 B1
(45) Date of Patent: May 23, 2006

(54) DISK DRIVE EMPLOYING OFF-LINE SECTOR VERIFICATION AND RELOCATION OF MARGINAL SECTORS DISCOVERED DURING READ ERROR RECOVERY PROCEDURE

(75) Inventor: Mark F. Vallis, Rancho Santa Margarita, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 562 days.

(21) Appl. No.: 10/160,955

(22) Filed: Jun. 1, 2002

(51) Int. Cl.
*G11B 5/09* (2006.01)

(52) U.S. Cl. ..................................... 360/53

(58) Field of Classification Search ................ 360/31, 360/53; 714/710
See application file for complete search history.

(56) References Cited

U.S. PATENT DOCUMENTS

| 5,844,911 | A | * | 12/1998 | Schadegg et al. ........... 714/710 |
| 5,914,967 | A | * | 6/1999 | Yomtoubian ................ 714/718 |
| 6,034,831 | A | * | 3/2000 | Dobbek et al. ............... 360/53 |
| 6,043,945 | A | | 3/2000 | Tsuboi et al. |
| 6,233,108 | B1 | | 5/2001 | Inoue |
| 6,289,484 | B1 | | 9/2001 | Rothberg et al. |
| 6,317,850 | B1 | | 11/2001 | Rothberg |
| 6,327,679 | B1 | * | 12/2001 | Russell ....................... 714/710 |
| 6,332,204 | B1 | * | 12/2001 | Russell ....................... 714/710 |
| 2002/0036855 | A1 | * | 3/2002 | Lenny et al. ................. 360/53 |

* cited by examiner

*Primary Examiner*—David Hudspeth
*Assistant Examiner*—Glenda P. Rodriguez
(74) *Attorney, Agent, or Firm*—Milad G. Shara, Esq.; Howard H. Sheering, Esq.

(57) ABSTRACT

A disk drive is disclosed wherein if multiple retries beyond a threshold are required to recover a data sector during a normal read operation, the data sector is added to a marginal sector list. During an off-line scan, the data sectors in the marginal sector list are verified. If the verification of a data sector fails, the data sector is relocated.

8 Claims, 4 Drawing Sheets

DISK DRIVE EMPLOYING OFF-LINE SECTOR VERIFICATION AND RELOCATION OF MARGINAL SECTORS DISCOVERED DURING READ ERROR RECOVERY PROCEDURE

CROSS REFERENCE TO RELATED APPLICATIONS AND PATENTS

This application is related to U.S. Pat. No. 6,317,850 entitled "ERROR RATE MEASUREMENT IN DISK DRIVE BY WEIGHTING DATA-RECOVERY PROCEDURES" issued Nov. 13, 2001, the disclosure of which is incorporated herein by reference.

BACKGROUND OF THE INVENTION

1. Field of the Invention

The present invention relates to disk drives for computer systems. More particularly, the present invention relates to a disk drive employing off-line verification and relocation of marginal sectors discovered during a read error recovery procedure.

2. Description of the Prior Art

Disk drives typically perform an error recovery procedure when a read error is encountered. The error recovery procedure typically involves performing a number of retry reads on the errant data sector while adjusting various parameters in the disk drive until the data sector is successfully recovered. U.S. Pat. No. 6,332,204 discloses a disk drive wherein a data sector is relocated if during a read operation the number of retries required to recover an errant data sector exceeds a predetermined threshold. However, the performance of the disk drive degrades as the number of relocated data sectors increases. In the aforementioned patent, a number of data sectors may be relocated unnecessarily if the read error is due to a bad write which may be overcome by rewriting the data sector rather than relocate the data sector. U.S. Pat. No. 6,233,108 discloses a disk drive which performs an off-line scan of all the data sectors by successively reading and writing data to each data sector on the disk. If a data sector requires multiple retries to recover, the data sector is rewritten and again read. If after rewriting a data sector it still requires multiple retries to successfully read, the data sector is relocated. However, verifying every data sector during an off-line scan is time consuming and inefficient since the number of defective sectors needing to be relocated is typically very small relative to the total number of data sectors.

There is, therefore, a need to improve the manner in which defective data sectors are located and relocated in a disk drive.

SUMMARY OF THE INVENTION

The present invention may be regarded as a disk drive comprising a disk having a plurality of tracks, each track comprising a plurality of data sectors for storing user data. The disk drive further comprises a head actuated radially over the disk, a marginal sector list, and a disk controller. The disk controller receives a read command from a host to read user data from a selected data sector. The disk controller positions the head over the selected data sector and the user data is read from the selected data sector. If a read error occurs, the disk controller performs multiple retry operations by iteratively repositioning the head over the selected data sector and rereading the selected data sector in an attempt to recover the user data. If the number of retries required to recover the user data from the selected data sector exceeds a threshold, the disk controller adds a sector identifier identifying the selected data sector to the marginal sector list. During an off-line scan, the disk controller retrieves the sector identifier from the marginal sector list and verifies the selected data sector. If the selected data sector fails the verification, the disk controller relocates the selected data sector.

In one embodiment, the off-line scan is executed at a predetermined interval and after the disk drive has been idle for a predetermined period.

In another embodiment, a plurality of parameters of the disk drive are adjusted during the iterative process of rereading the selected data sector. In one embodiment, the threshold is adjusted relative to the adjusted parameter which enables the user data to be recovered from the selected data sector. For example, the threshold is reduced for parameters that correlate highly with a defect on the disk to increase the probability that a data sector affected by the defect will be relocated before it becomes unrecoverable.

In one embodiment, the selected data sector is verified by attempting to read the user data from the selected data sector. If the read fails, a number of retry operations are performed to reread the selected data sector. If the number of retries exceeds a threshold before successfully recovering the user data, the user data is rewritten to the selected data sector and the selected data sector is read again. If the read fails, a number of retry operations are performed to reread the selected data sector, wherein if the number of retries exceeds a threshold the selected data sector fails the verification otherwise the selected data sector passes the verification.

The present invention may also be regarded as a method of operating a disk drive, the disk drive comprising a disk having a plurality of tracks, each track comprising a plurality of data sectors for storing user data. The disk drive further comprises a head actuated radially over the disk and a marginal sector list. A read command is received from a host to read user data from a selected data sector. The head is positioned over the selected data sector and the user data is read from the selected data sector. If a read error occurs, multiple retry operations are performed by iteratively repositioning the head over the selected data sector and rereading the selected data sector in an attempt to recover the user data. If the number of retries required to recover the user data from the selected data sector exceeds a threshold, a sector identifier identifying the selected data sector is added to the marginal sector list. During an off-line scan, the sector identifier is retrieved from the marginal sector list and the selected data sector is verified. If the selected data sector fails the verification, the selected data sector is relocated.

DESCRIPTION OF THE PREFERRED EMBODIMENTS

Figure 1:
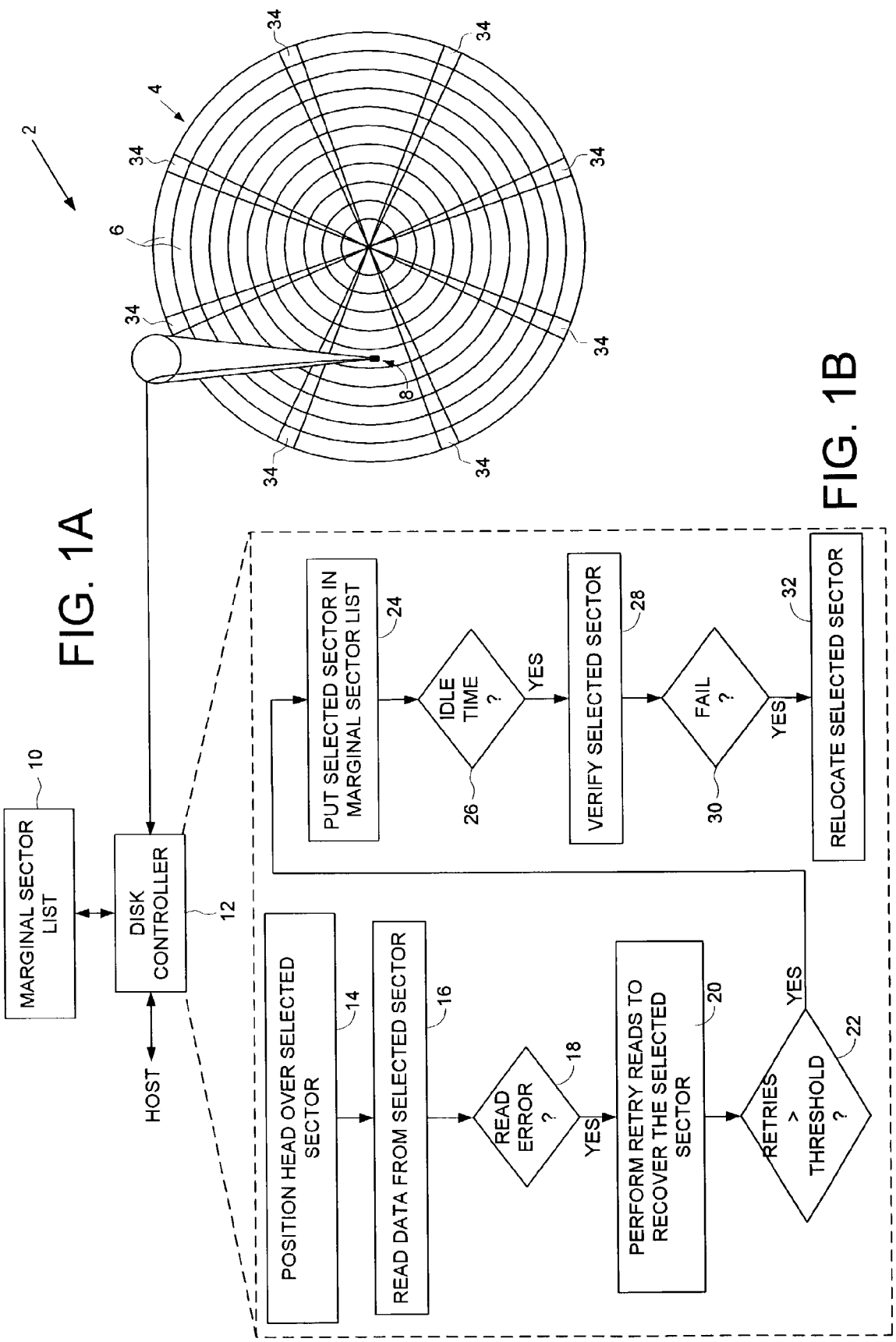
FIG. 1A shows a disk drive according to an embodiment of the present invention comprising a disk, a marginal sector list, and a disk controller for processing the marginal sector list during an off-line scan to verify and relocate marginal data sectors.
FIG. 1B is a flow diagram according to an embodiment of the present invention executed by the disk controller for performing a read operation, adding a data sector to the marginal sector list if multiple retries are required to recover the data sector, verifying the data sector during an off-line scan, and relocating the data sector if the sector verification fails.

FIG. 1A shows a disk drive 2 comprising a disk 4 having a plurality of tracks 6, each track 6 comprising a plurality of data sectors for storing user data. The disk drive 2 further comprises a head 8 actuated radially over the disk 4, a marginal sector list 10, and a disk controller 12. FIG. 1B is a flow diagram executed by the disk controller 12 for performing a read operation, adding a data sector to the marginal sector list if multiple retries are required to recover the data sector, verifying the data sector during an off-line scan, and relocating the data sector if the sector verification fails. At step 14 a read command is received from a host to read user data from a selected data sector and the head 8 is positioned over the selected data sector. At step 16 the user data is read from the selected data sector. If a read error occurs at step 18, multiple retry operations are performed at step 20 by iteratively repositioning the head 8 over the selected data sector and rereading the selected data sector in an attempt to recover the user data. If at step 22 the number of retries required to recover the user data from the selected data sector exceeds a threshold, at step 24 a sector identifier identifying the selected data sector is added to the marginal sector list 10. During an off-line scan when the disk enters an idle mode at step 26, the sector identifier is retrieved from the marginal sector list 10 and the selected data sector is verified at step 28. If the selected data sector fails the verification at step 30, the selected data sector is relocated at step 32.

In the embodiment of FIG. 1A, each track 6 comprise a plurality of embedded servo sectors distributed circumferentially around the disk 4 forming a plurality of servo wedges 34. Each embedded servo sector comprises coarse head positioning information, such as a track number, and fine head positioning information, such as servo bursts recorded at precise intervals and offsets with respect to a track's centerline. During read and write operations, the disk controller 12 processes the information recorded in the embedded servo sectors to maintain the head 8 over the centerline of the target track. A read error may occur due to a transient error in the servo tracking operation causing the head 8 to deviate from the track centerline while reading user data from a data sector. The error may be overcome by rereading the data sector during a retry operation. A read error may also occur due to a transient error in the servo tracking operation during a write operation causing the head 8 to deviate from the track centerline while writing user data to a data sector. Write errors of this nature are overcome during the sector verification step 28 of FIG. 1B by reading and then rewriting the user data to the data sector as described below with reference to FIG. 3. Read errors may also be due to a defect on the surface of the disk 4 which are overcome at step 32 of FIG. 1B by relocating marginal data sectors to spare data sectors.

The threshold at step 22 of FIG. 1B is preferably selected to achieve a desired performance. For example, if the number of retries required to recover a data sector results in a delay perceptible by the end user, the data sector may be added to the marginal sector list 10. In another embodiment, the disk controller 12 may adapt the threshold relative to the work load of the disk drive and the average number of marginal sectors added to the marginal sector list 10. For example, the disk controller 10 may continuously adjust the threshold so that on average a predetermined number of data sectors are added to the marginal sector list 10 over a predetermined number of read operations. This ensures that at least some data sectors are added to the marginal sector list 10 while also ensuring there is sufficient time during idle mode to verify the data sectors.

Figure 2:
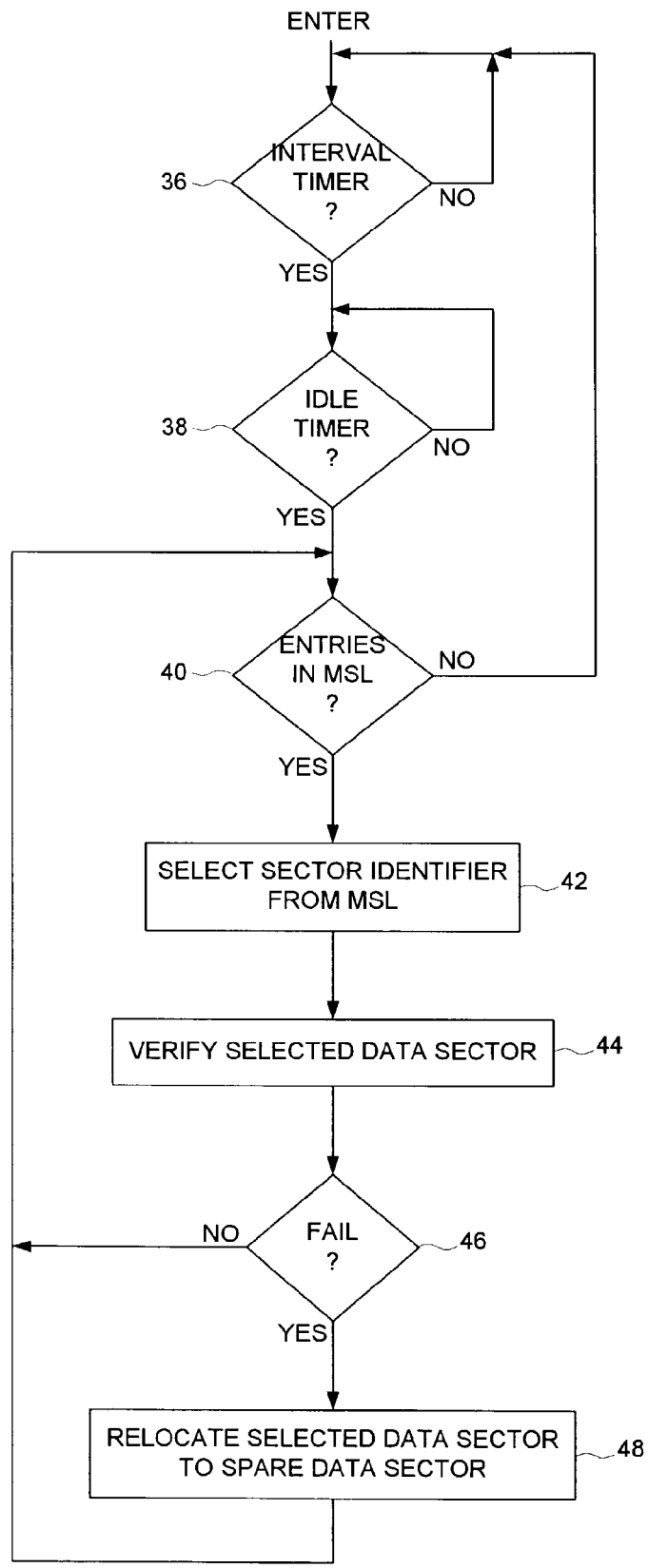
FIG. 2 is a flow diagram showing further details of the steps executed during the off-line scan according to an embodiment of the present invention.

FIG. 2 is a flow diagram showing further details of the steps executed during the off-line scan of FIG. 1B according to an embodiment of the present invention. In one embodiment, the off-line scan is performed whenever the marginal sector list 10 comprises at least one entry and the disk drive is in an idle mode for a predetermined period. In an alternative embodiment, the off-line scan is performed over a periodic interval, for example, every twenty-four hours. Referring to FIG. 2, if at step 36 the periodic interval has expired, then at step 38 the off-line scan is executed if the disk drive has been in an idle mode for a predetermined period. If so and at step 40 the marginal sector list 10 comprises at least one entry, then at step 42 a sector identifier is selected from the marginal sector list 10 and verified at step 44. If the verification fails at step 46, then at step 48 the selected data sector is relocated to a spare data sector. In one embodiment, a data sector is relocated by mapping a logical block address (LBA) from a physical block address (PBA) of the marginal data sector to the PBA of a spare data sector.

Figure 3:
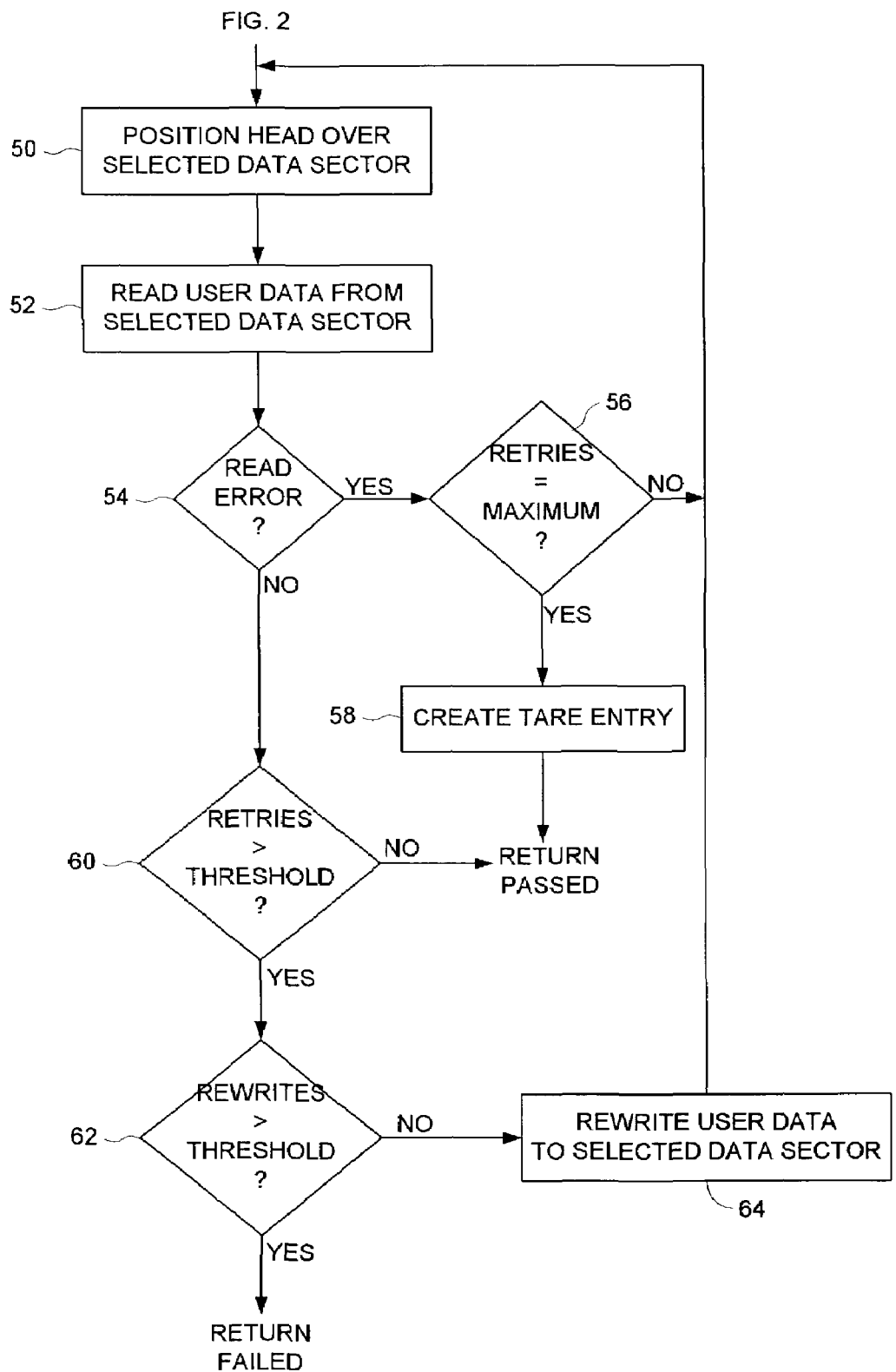
FIG. 3 is a flow diagram showing further details of the steps executed to verify a selected data sector according to an embodiment of the present invention.

FIG. 3 is a flow diagram showing further details of the steps executed to verify a selected data sector at step 44 of FIG. 2 according to an embodiment of the present invention. At step 50 the head 8 is positioned over the selected data sector and at step 52 user data is read from the selected data sector. If at step 54 a read error is detected, and at step 56 a number of retries has not exceed a maximum, then a retry read is performed starting at step 50. If at step 56 the number of retries has exceeded the maximum, then at step 58 a TARE entry is created for the data sector, wherein the TARE entry identifies the data sector as unrecoverable. In one embodiment, when a data sector having a TARE entry is overwritten with new user data, the data sector is verified before deleting the user data from the semiconductor memory. If the data sector fails the verification, the data sector is relocated to a spare data sector and the user data written to the spare data sector.

Referring again to FIG. 3, if a read error is not detected at step 54 and at step 60 the number of retries required to recover the data sector does not exceed a threshold, then the data sector is deemed to have passed the verification. If the number of retries required to recover the data sector exceeds the threshold at step 60, and at step 62 a number of rewrites has not exceeded a threshold, then at step 64 the user data is rewritten to the data sector and the verification process re-iterated starting at step 50. If at step 62 the number of rewrites has exceeded the threshold, then the data sector is deemed to have failed the verification and it is relocated to a spare data sector at step 48 of FIG. 2.

In one embodiment, the disk controller 12 adjusts a plurality of parameters of the disk drive 2 while iteratively rereading a selected data sector in an attempt to recover the data sector. The parameter may be adjusted at step 20 of FIG.

Figure 4:
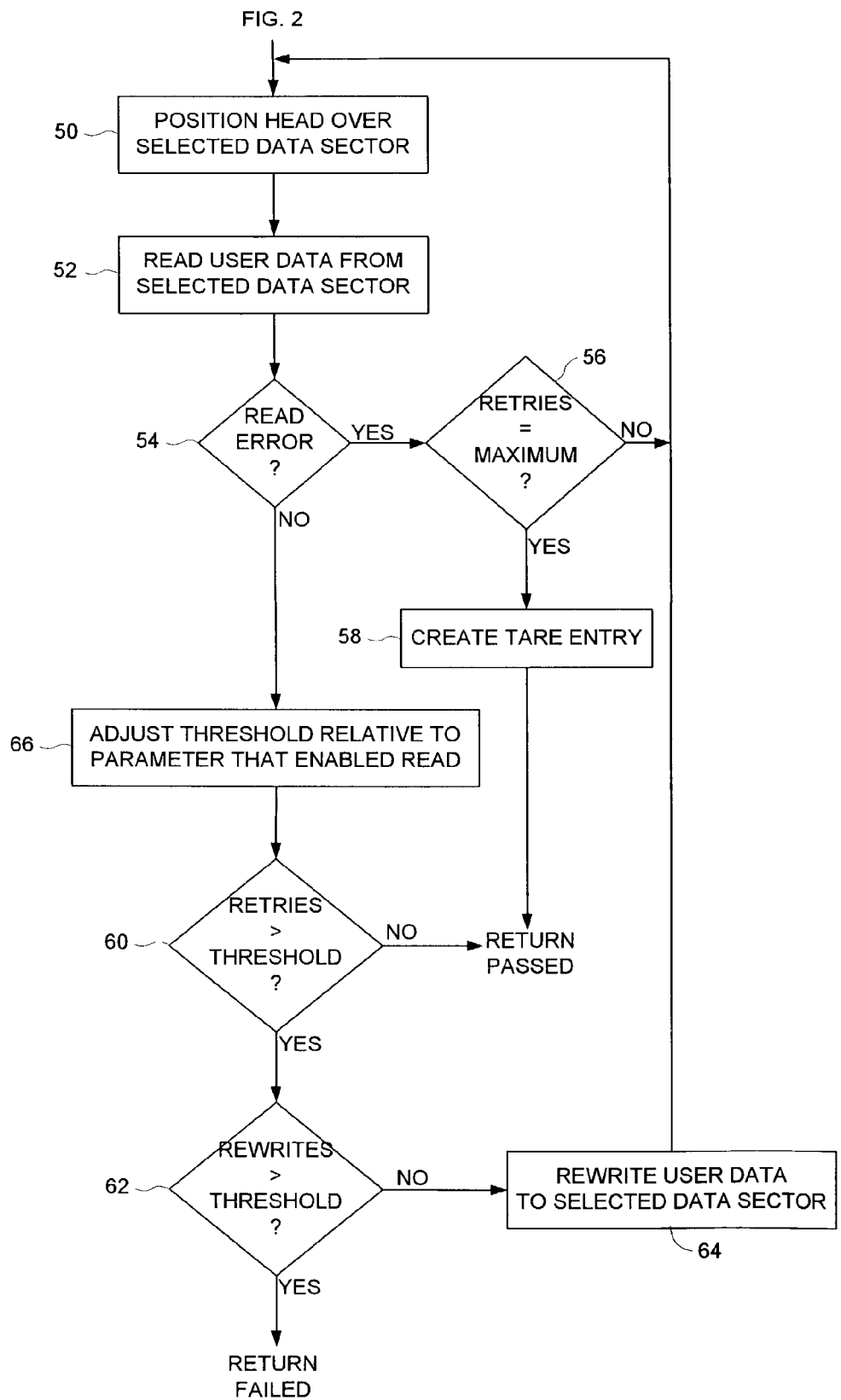
FIG. 4 is a flow diagram showing an embodiment of the steps executed to verify a selected data sector wherein the threshold used to identify a marginal data sector is adjusted relative to a parameter adjustment that enabled recovery of the data sector.

1B and/or during the off-line verification process. Example parameters may include read channel parameters (e.g., equalizer coefficients, timing coefficients, gain coefficients, etc.), servo control parameters (e.g., tracking offset, repeatable run-out, etc.), or any other suitable parameter. FIG. 4 is a flow diagram showing an embodiment of the present invention wherein at step 66 the threshold used to identify a marginal data sector is adjusted relative to a parameter adjustment that enabled recovery of the data sector. For example, in one embodiment the threshold is reduced for parameters that correlate highly with a defect on the disk 4 in order to increase the probability that a data sector affected by the defect will be relocated before it becomes unrecoverable. Example parameters that correlate highly with a disk defect are disclosed in the above referenced U.S. patent entitled "ERROR RATE MEASUREMENT IN DISK DRIVE BY WEIGHTING DATA-RECOVERY PROCEDURES". The threshold adjusted at step 66 may include the threshold for the comparison at step 60 or the threshold for the comparison at step 62. In another embodiment, the threshold at step 22 in FIG. 1B is adjusted relative to the parameter adjustment that enabled recovery of a data sector at step 20.

I claim:

1. A disk drive comprising:
   (a) a disk comprising a plurality of tracks, each track comprising a plurality of data sectors for storing user data;
   (b) a head actuated radially over the disk;
   (c) a marginal sector list; and
   (d) a disk controller for:
      receiving a read command from a host computer to read user data from a selected data sector;
      positioning the head over the selected data sector;
      reading the user data from the selected data sector;
      if a read error occurs:
         performing multiple retry operations by iteratively repositioning the head over the selected data sector and rereading the selected data sector in an attempt to recover the user data;
         if the number of retries required to recover the user data from the selected data sector exceeds a threshold, adding a sector identifier identifying the selected data sector to the marginal sector list;
         during an off-line scan, retrieving the sector identifier from the marginal sector list and verifying the selected data sector; and
         if the selected data sector fails the verification, relocating the selected data sector,
      adjusting a plurality of parameters of the disk drive during the iterative process of rereading the selected data sector; and
      adjusting the threshold relative to the adjusted parameter which enables the user data to be recovered from the selected data sector.

2. The disk drive as recited in claim 1, wherein the off-line scan is executed at a predetermined interval and after the disk drive has been idle for a predetermined period.

3. The disk drive as recited in claim 1, wherein the disk controller reduces the threshold for parameters that correlate highly with a defect on the disk.

4. The disk drive as recited in claim 1, wherein the selected data sector is verified by:
   (a) attempting to read the user data from the selected data sector;
   (b) if the read fails, performing a number of retry operations to reread the selected data sector;
   (c) if the number of retries exceeds a threshold before successfully recovering the user data, rewriting the user data to the selected data sector;
   (d) attempting to read the selected data sector again; and
   (e) if the read fails, performing a number of retry operations to reread the selected data sector, wherein if the number of retries exceeds a threshold the selected data sector fails the verification, otherwise the selected data sector passes the verification.

5. A method of operating a disk drive, the disk drive comprises a disk comprising a plurality of tracks, each track comprising a plurality of data sectors for storing user data, a head actuated radially over the disk, and a marginal sector list, the method comprising the steps of:
   (a) receiving a read command from a host computer to read user data from a selected data sector;
   (b) positioning the head over the selected data sector;
   (c) reading the user data from the selected data sector;
   (d) if a read error occurs:
      performing multiple retry operations by iteratively repositioning the head over the selected data sector and rereading the selected data sector in an attempt to recover the user data;
      if the number of retries required to recover the user data from the selected data sector exceeds a threshold, adding a sector identifier identifying the selected data sector to the marginal sector list;
      during an off-line scan, retrieving the sector identifier from the marginal sector list and verifying the selected data sector; and
      if the selected data sector fails the verification, relocating the selected data sector;
   (e) adjusting a plurality of parameters of the disk drive during the iterative process of rereading the selected data sector; and
   (f) adjusting the threshold relative to the adjusted parameter which enables the user data to be recovered from the selected data sector.

6. The method as recited in claim 5, wherein the off-line scan is executed at a predetermined interval and after the disk drive has been idle for a predetermined period.

7. The method as recited in claim 5, further comprising the step of reducing the threshold for parameters that correlate highly with a defect on the disk.

8. The method as recited in claim 5, wherein the step of verifying the selected data sector comprises the steps of:
   (a) attempting to read the user data from the selected data sector;
   (b) if the read fails, performing a number of retry operations to reread the selected data sector;
   (c) if the number of retries exceeds a threshold before successfully recovering the user data, rewriting the user data to the selected data sector;
   (d) attempting to read the selected data sector again; and
   (e) if the read fails, performing a number of retry operations to reread the selected data sector, wherein if the number of retries exceeds a threshold the selected data sector fails the verification, otherwise the selected data sector passes the verification.

* * * * *